United States Patent [19]
Eckley et al.

[11] Patent Number: 6,163,797
[45] Date of Patent: *Dec. 19, 2000

[54] APPLICATION DISPATCHER FOR SEAMLESS, SERVER APPLICATION SUPPORT FOR NETWORK TERMINALS AND NON-NETWORK TERMINALS

[75] Inventors: Gordon P. Eckley, Foresthill, Calif.; Richard M. Cowan, Honolulu, Hi.; Prasad V. R. Panchangam, Santa Clara, Calif.

[73] Assignee: Hewlett-Packard Company, Palo Alto, Calif.

[ * ] Notice: This patent is subject to a terminal disclaimer.

[21] Appl. No.: 09/121,206

[22] Filed: Jul. 22, 1998

Related U.S. Application Data

[63] Continuation of application No. 08/692,489, Aug. 6, 1996, Pat. No. 5,828,840.

[51] Int. Cl.[7] ....................................... G06F 15/16
[52] U.S. Cl. ............................. 709/203; 709/205
[58] Field of Search ....................... 709/224, 203, 709/205, 219; 345/335

[56] References Cited

U.S. PATENT DOCUMENTS

| | | | |
|---|---|---|---|
| 4,588,211 | 5/1986 | Greene | 283/70 |
| 4,991,089 | 2/1991 | Shorter | 364/200 |
| 5,201,049 | 4/1993 | Shorter | 395/650 |
| 5,287,461 | 2/1994 | Moore | 395/275 |
| 5,291,597 | 3/1994 | Shorter et al. | 395/650 |
| 5,394,401 | 2/1995 | Patrick et al. | 370/85.5 |
| 5,430,863 | 7/1995 | Kmiec | 395/500 |
| 5,442,791 | 8/1995 | Wrabetz et al | 395/650 |
| 5,457,797 | 10/1995 | Butterworth et al | 395/650 |
| 5,491,796 | 2/1996 | Wanderer et al | 395/200.9 |
| 5,530,961 | 6/1996 | Janay et al | 395/153 |
| 5,602,918 | 2/1997 | Chen et al. | 380/21 |
| 5,828,840 | 10/1998 | Cowan et al. | 709/203 |
| 5,999,972 | 12/1999 | Gish | 709/219 |
| 6,012,066 | 1/2000 | Discount et al. | 707/103 |
| 6,012,083 | 1/2000 | Savitzky et al. | 709/202 |

*Primary Examiner*—Zarni Maung
*Assistant Examiner*—Yeshi Gebremeskel

[57] ABSTRACT

A plurality of clients are connected to one or more servers. When a client initiates a connection with a server, the server responds to the request for connection by transmitting a message back to the client to determine whether the client is a network terminal or not. The client responds with a message that is received by an application dispatcher at the server which takes one of a pair of actions based on whether the client is a network terminal. If the client terminal is a network terminal, then the application dispatcher starts a server application in the server which responds to the client application in the client. Going forward, the server application responds to all future requests from the client application. If the client is not a network terminal, then the application dispatcher initiates a client application in the server to service the client terminal application requirements. Requests from the client application on behalf of the client terminal are subsequently serviced by a server application at the server which communicates to the client terminal via the client application at the server. In one embodiment, the application dispatcher includes a listener. The listener is assigned to a particular port number of the server. The listener is responsible for waiting for new incoming connections from a client terminal (e.g., a network terminal or non-network terminal). When a new incoming connection is detected, the listener dynamically instantiates a resolver and passes the connection to the resolver. The behavior of the resolver can vary depending on the port number and requirements of the client terminal. For example, for a network terminal, such as a commercially available VeriFone Personal ATM™ (PATM™) appliance or a Personal Computer (PC), the resolver is responsible for executing "who are you" negotiation and for generating a session key.

29 Claims, 16 Drawing Sheets

ACK/NAK Packet

| Header | Packet Type/Byte Count | Header CRC | Sequence # | Data Block | CRC-16 |
|---|---|---|---|---|---|

Command or Response Packet

FIG. 10

| Name | Size | Remarks |
|---|---|---|
| Length | 1 byte | Length of data to follow. (For Block Symmetric Encoding) |
| SubDevice Type | 1 byte | Selects the subdevice: System, Display, Keypad, and ICC. |
| Command | 1 byte | Command byte is Device Type dependent |
| Parameters | <variable> | This field is Command and Device Type dependent<br>For Command Message: command data parameters<br>For Response Message: 1 byte status, followed by requested data, if any |

FIG. 12

| Name | Size | Remarks |
|---|---|---|
| Header | 2 bytes | Has the value 0xAA(MSB), 0x55(LSB) |
| Packet Type/ Byte Count | 2 bytes | The Packet Type is contained in the most 4 significant bits, b15 - b12. This determines if it is a test packet, control packet, or data (command or response) packet: <br> Control Packet <br> • ACK <br> • NAK <br> Data (Command or Response) Packet <br> • More Blocks to follow <br> • Last Block <br> • Data Encrypted/Non -encrypted <br> Test Packet <br> • Server Initiated Test Mode , loopback <br><br> The Byte Count is contained in the remaining 12 bits, b11 - b0 (4095 max value), the size of the Sequence # and Data Block. |
| Header CRC | 2 bytes | Checksum of the Packet Type/Byte Count. For ACK and NAK packets, this is the last transmitted data. |
| Sequence # | 1 byte | Optional field, valid only for non-ACK/NAK packets. Start block is always 0, subsequent blocks will be incremented by 1. |
| Data Block | Byte Count -1 | Optional field, valid only for non-ACK/NAK packets. The Command or Response Message may be broken up into smaller packets (blocks), and may further be encrypted. |
| CRC-16 | 2 bytes | 2 byte CRC calculation, from Sequence # to the last byte of the Data Block field. It is the standard 16-bit CRC-CCITT algorithm: <br> $G(x) = x^{16} + x^{12} + x^5 + 1$ |

FIG. 11

| Command | Description | Data Parameters |
|---|---|---|
| 0 | Store text string into NV memory. | Table, offset, string. |
| 1 | Display raw text. | String, column. |
| 2 | Display preset prompt from NV memory. | Table, offset, column. |
| 3 | Set local echo. | None. |
| 4 | Clear local echo. | None. |
| 5 | Set secure echo (display '*'). | None. |
| 6 | Clear secure echo. | None. |

FIG. 13

| Status | Description |
|---|---|
| 0 | Successful operation. |
| 1 | Invalid command. |
| 2 | Too many characters. |
| 3 | Illegal prompt selection. |

FIG. 14

APPLICATION DISPATCHER FOR SEAMLESS, SERVER APPLICATION SUPPORT FOR NETWORK TERMINALS AND NON-NETWORK TERMINALS

CROSS-REFERENCE TO RELATED APPLICATIONS

This application is a continuing application of application Ser. No. 08/692,489 entitled "System, Method and Article of Manufacture for Seamless, Server Application Support of Network and Non-Network Client Terminals", and filed on Aug. 6, 1996, now U.S. Pat. No. 5,828,840, which is incorporated herein by reference in its entirety.

COPYRIGHT NOTIFICATION

A portion of the disclosure of this patent document contains material that is subject to copyright protection. The copyright owner has no objection to the facsimile reproduction by anyone of the patent disclosure, as it appears in the Patent Trademark Office patent files or records, but otherwise reserves all copyrights whatsoever.

FIELD OF THE INVENTION

The present invention generally relates to improvement in computer systems, and more particularly, to system software for managing a network of heterogeneous client terminals communicating with a server in a consistent manner.

BACKGROUND OF THE INVENTION

Recently it has become increasingly fashionable to speak of "intelligent," "smart," or "programmable" terminals and systems. Very few mainframe or peripheral manufacturers omit such a device from their standard product line. Although "intelligence," like beauty or art, is in the eye of the beholder, the adjective generally connotes that the drive has a degree of autonomy or processing ability which allows it to perform certain tasks without assistance from the mainframe to which it is connected. Many such devices are programmable by virtue of including a microprocessor.

While operational devices are somewhat hazy and non-standard, a device is referred to as a terminal if a user interacts with the device to communicate to a host processor, referred to as a server in a network computing environment. Examples of terminals include keyboard/printer terminals, cathode-ray tube (CRT) terminals, remote-batch terminals, real-time data-acquisition and control terminals, transaction and point-of-sale terminals, and smart terminals.

A terminal is considered to be intelligent if it contains hard-, firm-, and or software which allows it to perform alphanumeric or graphic message entry, display buffering, verifying, editing and block transmissions, either on host or human command. If the terminal contains a microprocessor which runs a standard program to service the terminal, and not arbitrary, user-loaded programs, the terminal has a fixed function, and is still just an intelligent terminal. Only when the device contains a general purpose computer which is easily accessible to the ordinary user for offering a wide range of programs selectable by a user or by devices attached to the device does the terminal become a network terminal in accordance with a preferred embodiment.

Sun has recently introduced a new language that is designed to provide consistency for network applications, named Java. Java is a general-purpose, concurrent, class-based, object-oriented programming language and support structure, specifically designed to have as few implementation dependencies as possible. Java allows application developers to write a program once and then be able to run it everywhere on a computer network.

The Java™ language solves many of the client-side problems by:
  enabling dynamic class bindings;
  providing enhanced portability of applications; and
  providing a secure environment in which applications execute.

Java is compiled into bytecodes in an intermediate form instead of machine code (like C, C++, Fortran, etc.). The bytecodes execute on any machine with a Java bytecode interpreter. Thus, Java applications can run on a variety of client machines, and the bytecodes are compact and designed to transmit efficiently over a network which enhances a preferred embodiment with universal clients and server-centric policies.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time applications can be created using the above-mentioned components.

Sun's Java™ language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator ™ browser) by copying code from the server to client: From a language standpoint, Java's core feature set is based on C++. Sun's Java™ language literature states that Java is basically "C++, with extensions from Objective C for more dynamic method resolution".

The term "distributed computing" refers both to the devices at remote locations and to the logic which has been used to enhance the intelligence of the devices. Such distributed or decentralized computing with remote intelligent terminals and network terminals" is a fact of life in today's computer literate society.

There are a number of drawbacks to distributed computing environments which are not found in a centralized computing environment. First, hardware problems: when a user locates a software solution that is optimal for the user's terminal environment, the software often will not execute on the host processor that is universally accessible by other's in a company. Moreover, the software will often be incompatible with other user's terminals.

Second, interfacing problems: a nonstandard terminal might require a special-purpose interface and might not be recognized by the host. Even standard interfaces are notorious for crashing the operating system. In any case, "mixed systems" containing multiple vendor hardware are becoming the norm, but lead to the blame for system problems being placed on the other system, and result in difficult debugging and resolving of system problems.

Third, host operating system support for a heterogeneous terminal environment can be a nightmare. To provide support for all of the various protocols, communication rates and processing demands with the peculiarities intrinsic to a motley crew of downstream terminals in a system administration headache.

Fourth, local software support: this type of support ranges from minimal (e.g., a compiler for the particular terminal) to a mail program that is compatible with every different terminal attached to the host server. Some applications can be rebuilt for a particular terminal by simply recompiling the application, but many are only distributed as runtime modules with no support provided for some terminals.

SUMMARY OF THE INVENTION

The foregoing problems are overcome in an illustrative embodiment of the invention in a network computing environment in which a plurality of clients are connected to one or more servers. When a client initiates a connection with a server, the server responds to the request for connection by transmitting a message back to the client to determine whether the client is a network terminal or not. The client responds with a message that is received by an application dispatcher at the server which takes, for example, one of a pair of actions based on whether the client is a network terminal. If the client terminal is a network terminal, then the application dispatcher starts a server application in the server which responds to the client application in the client. Going forward, the server application responds to all future requests from the client application. If the client is a non-network terminal, then the application dispatcher initiates a client application in the server to service the client terminal application requirements. Requests from the client application on behalf of the client terminal are subsequently services by a server application at the server which communicates to the client terminal via the client application at the server.

A network terminal in accordance with one embodiment would execute Java applications in stand-alone mode, but have the capability to interact with a server for such functions as retrieving information, database processing, massive computation processing, and access to shared devices such as high-speed printers, plotters, and magnetic tapes.

In one embodiment, the application dispatcher includes a listener. The listener is assigned to a particular port number of the server. The listener is responsible for waiting for new incoming connections from a client terminal (e.g., a network terminal or a non-network terminal). When a new incoming connection is detected, the listener dynamically instantiates a resolver and passes the connection to the resolver. The behavior of the resolver can vary depending on the port number and requirements of the client terminal. For example, for a network terminal, such as a commercially available VeriFone Personal ATM™ (PATM™) appliance or a Personal Computer (PC), the resolver is responsible for executing "who are you" negotiation and for generating a session key. The listener's dynamic instantiation of the resolver functionality can be efficiently implemented using the well-known Java™ programming language: for example, the listener instantiates the appropriate resolver using the fully-qualified Java class name, which is provided in configuration data. Accordingly, this embodiment provides an architecture that allows the application dispatcher to efficiently and flexibly handle different connection types involving a variety of different types of network and non-network client terminals utilizing a variety of different protocols. Moreover, new connection types, terminals, and protocols can be added without modifying server software.

BRIEF DESCRIPTION OF THE DRAWINGS

The foregoing and other aspects and advantages of the present invention will become apparent from the following detailed description with reference to the drawings, in which:

FIG. 10 illustrates the message format utilized in accordance with a preferred embodiment;

FIG. 11 presents a table showing additional details associated with the device types, commands and data blocks, in accordance with a preferred embodiment;

FIG. 12 presents additional details on the message format in accordance with a preferred embodiment;

FIG. 13 illustrates the display commands and responses in accordance with a preferred embodiment;

FIG. 14 presents the status values associated with various operations in accordance with a preferred embodiment;

DETAILED DESCRIPTION OF THE INVENTION

Figure 1:
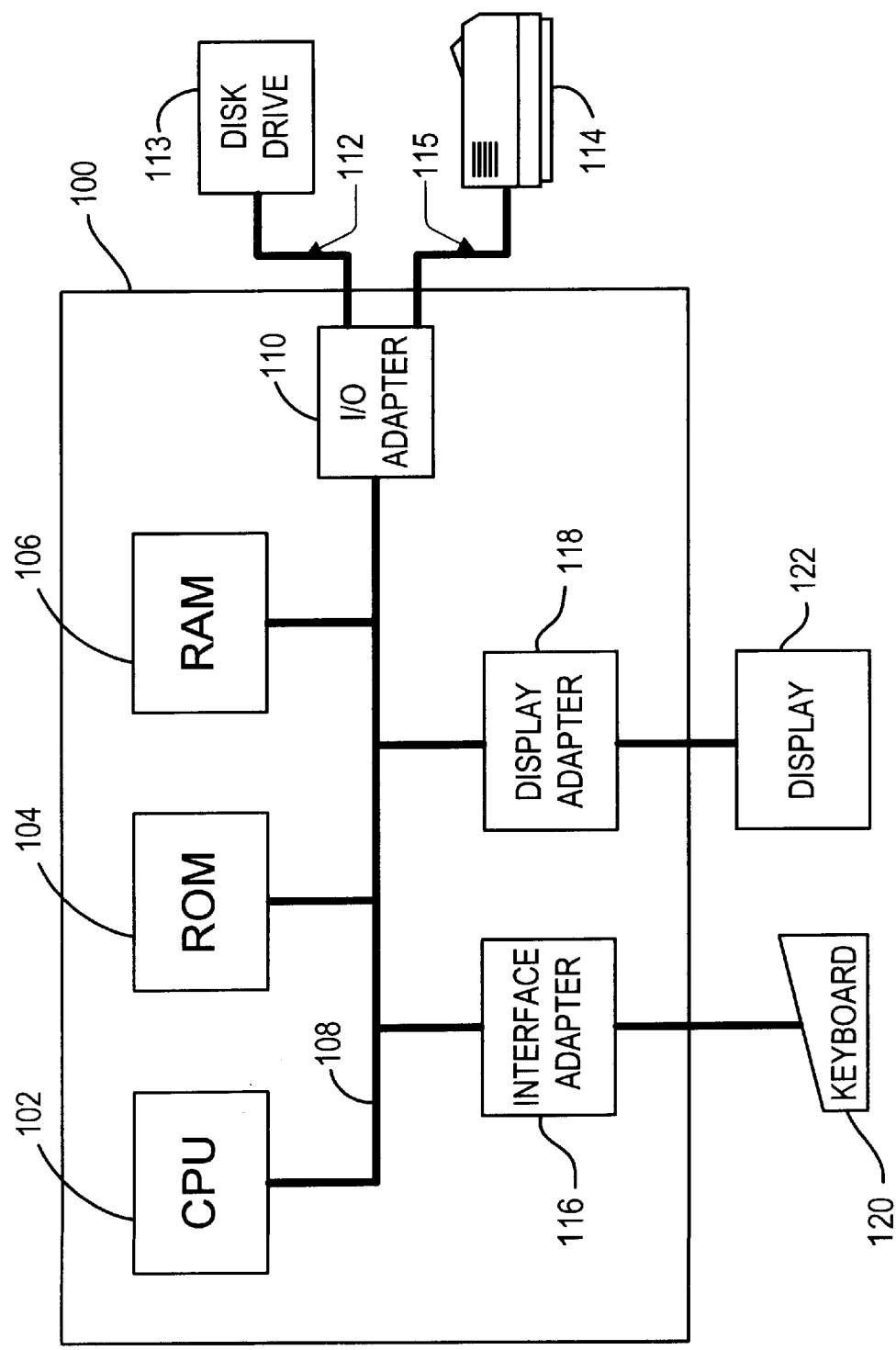
FIG. 1 is a block diagram of a computer system, for example, a personal computer system on which the inventive object-oriented information manager operates.

The invention is preferably practiced in the context of an operating system resident on a computer such as a SUN, IBM, HP, or a Windows NT Computer. A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most server computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral or network devices such as a disk unit 113 and printer 114 to the bus 108, via cables 115 or peripheral bus 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The computer has resident thereon and is controlled and coordinated by operating system software such as the SUN Solaris, Windows NT or JavaOS operating system.

Figure 2:
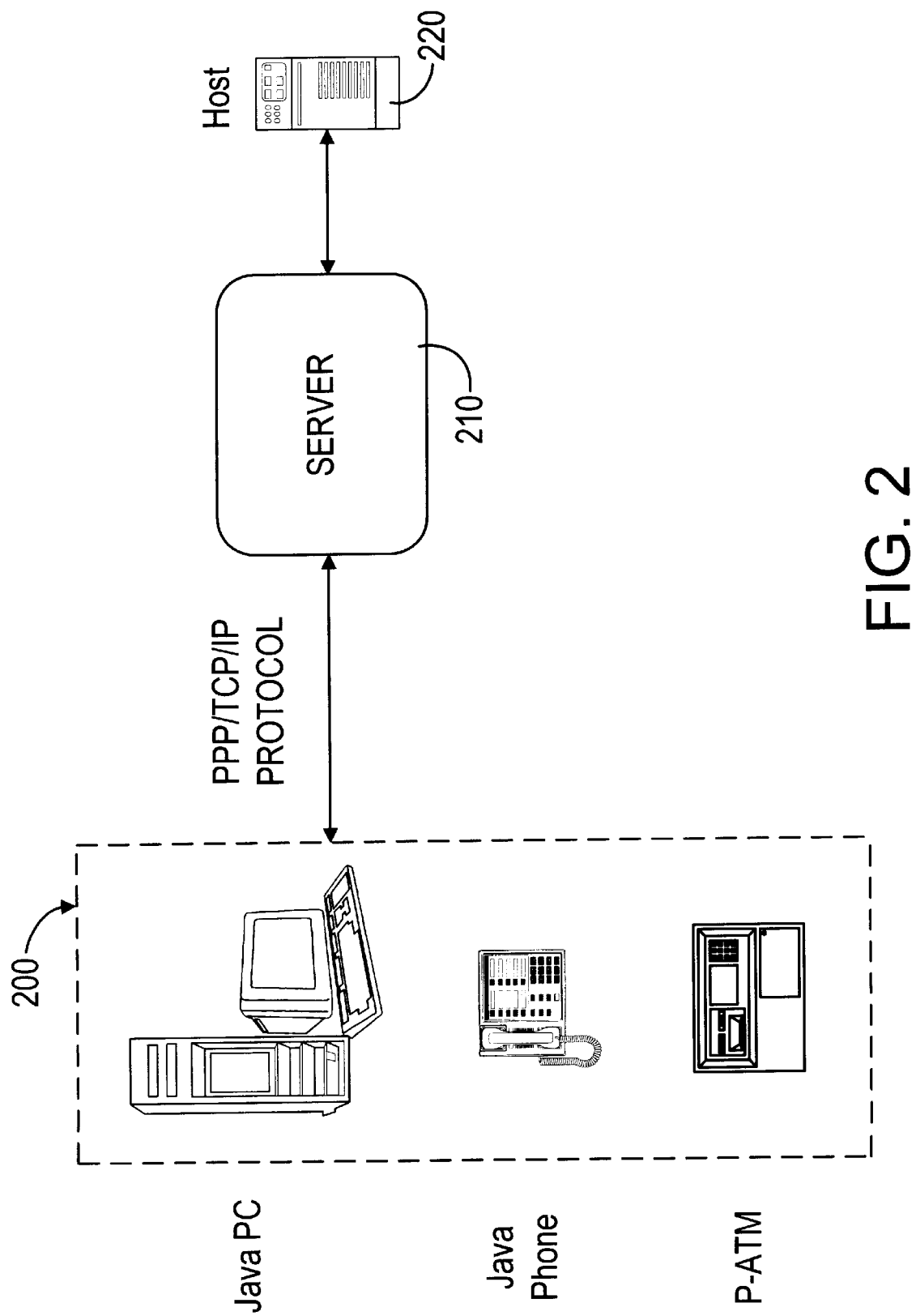
FIG. 2 illustrates a client-server network in accordance with a preferred embodiment.

FIG. 2 illustrates a client-server network in accordance with a preferred embodiment. A set of consumer devices (client terminals 200) are attached to a server 210 and the server is attached to a legacy host 220 to process applications requiring information at the host 220. The connection could be by means of the Internet, a dialup link, token ring, cellular phone, satellite, TI or X.25 telco link or other communication means.

Server Software

The server software is written using a combination of Java, C or possibly C++, C or C++ will be used mainly to implement platform dependent code (such as dealing with the comm ports). While a preferred embodiment discloses support for a dial up network and Internet processing utilizing TCP/IP, one of ordinary skill in the art will readily realize that a token ring, SNA or other network, such as those discussed in U.S. patents (U.S. Pat. Nos. 5,530,961; 5,491,796; 5,457,797; 5,442,791; 5,430,863; 5,394,401; 5,291,597; 5,287,537; 5,287,461; 5,201,049; 4,991,089; and 4,588,211) could be readily interchanged as the network.

Architecture

A server architecture in accordance with a preferred embodiment supports two types of client terminals.

Network terminals. These are client terminals capable of directly executing the Java applications on the client terminal which are initially stored on a server. The server will simply download this code to the client's network terminal which the client will then execute to provide a particular service. This service may or may not interact with other clients or servers. Network terminals can be connected to a server through a dial up modem link, directly through a local area network, or by other network communication means in accordance with a preferred embodiment.

Non-network terminals. These are client's terminals which are not capable of executing Java applications on the client terminal. When dealing With this class of client the server will execute the application on behalf of the client. In this case the server will only expect necessary input and output operations to be performed by the client terminal. An example of how to connect a plurality of non-network terminals to a host server is described in U.S. Pat. No. 5,287,461, the disclosure of which is hereby incorporated by reference in its entirety.

Figure 3:
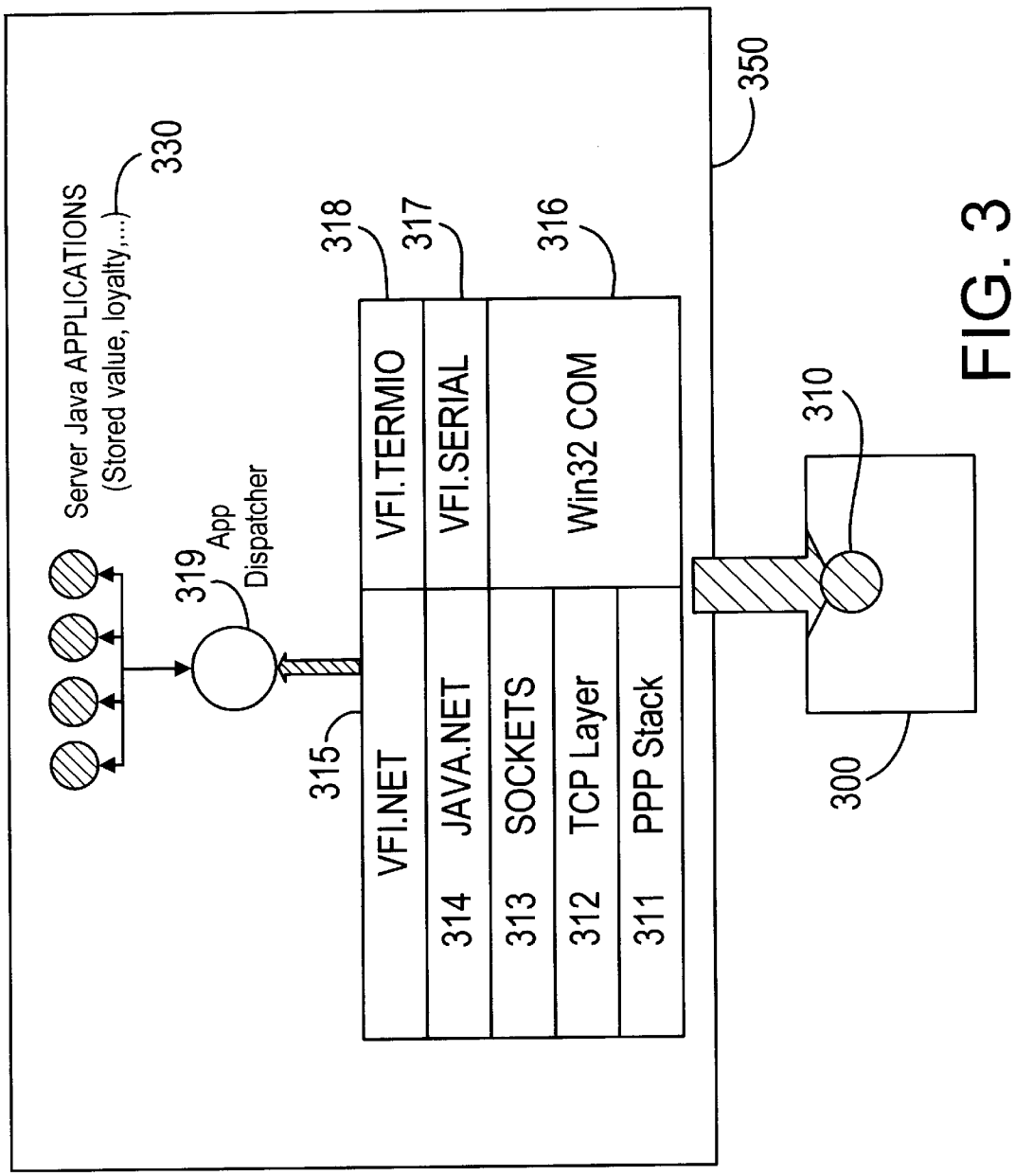
FIG. 3 illustrates a server architecture in accordance with a preferred embodiment.

FIG. 3 illustrates a server architecture in accordance with a preferred embodiment. A client 300 would initiate a connection with a server 350 by, for example, dialing in to a modem pool which is intercepted by the point-to-point stack software 311 which conforms information received to the TCP layer 312 which obtains a socket 313 for connecting the client 310 to the server 350. The Java net layer 314 further refines the request to conform with the TERMIO and NET layer 315 which passes the request along to the application dispatcher 319. The application dispatcher 319 spawns the appropriate server application selected from the server applications 330. On a non-network terminal, the non-network terminal initiates a "first connection" by dialing up a modem, for example. The dial up goes through the native OS 316 (Solaris or Windows NT dial up layer) and is connected with the serial communication in the VFI.SERIAL layer 317 which abstracts the serial input/output functions into a higher level communication layer. The VFI.NET layer 315 takes the abstracted serial layer and maps it into a similar communication as the communication from the network terminal 300. It makes the dialup asynchronous connection appear to the server application as a new socket connection.

Network Terminal—"First Connection"

Figure 4:
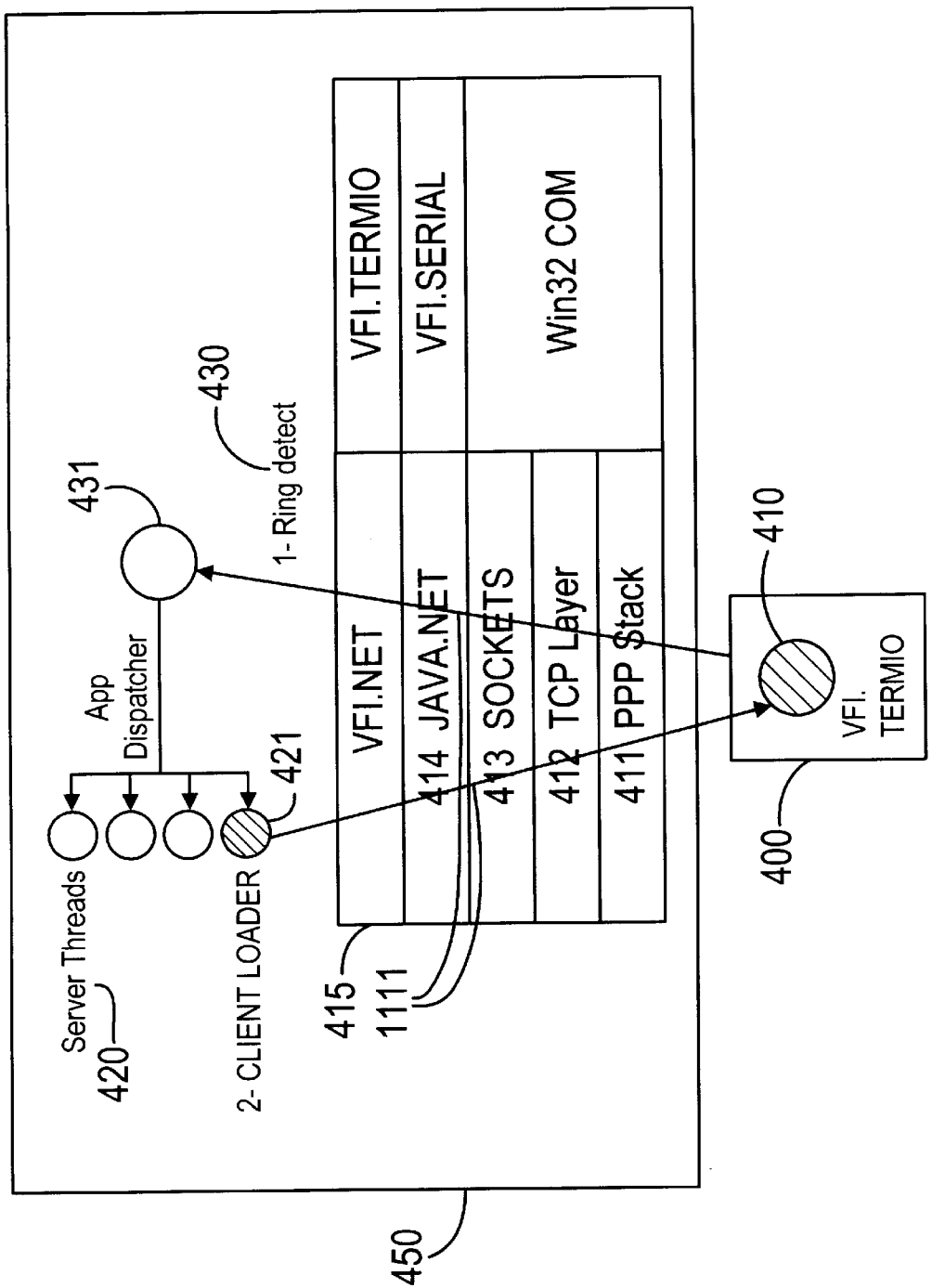
FIG. 4 illustrates a client-server architecture in accordance with a preferred embodiment.

FIG. 4 illustrates a client-server architecture in accordance with a preferred embodiment. The architecture is illustrated initially for a network terminal for clarity and then follows with a non-network terminal. Processing commences at 400 when a network terminal requests connection through a layered communication system to a set of server threads 420 which are triggered by a detection of a "ring" 430 to initiate possible client updates and the subsequent client application to server application processing. "Ring" refers to a "first connection" in socket processing in accordance with a preferred embodiment.

The network terminal makes its connection through the Point-to-Point-Protocol stack 411 utilizing the TCP layer 412 and the sockets layer 413, which is like an electrical socket, for attaching terminals to communication sockets to facilitate communication through the network. All of this is managed by the Java.net 414 which connects the socket 1111 via the TCP layer 412 and the PPP stack 411. The layer above is the VFI.net and VFI.TERMIO 415 which is responsible for detecting that the connection is made and mapping the connection to an application dispatcher 431 to further process the first connection (ring) request.

The server 450 waits for a "first connection" request much like an interrupt manager. When a "first connection " request arrives, then the application dispatcher has a method that detects a connect request or a LAN "first connection" request that would arrive through the TCP layer as a socket connect. That connection is translated into a logical ring which is equivalent to an event or interrupt. The server 450 responds to the "first connection" with a query initiated by the application dispatcher 431 requesting "who are you" via an enquiry message asking for identification by the client loader thread 421. The network terminal responds with ID information, including the identification of the application that the network terminal requires. If the terminal answers with an identifier indicating that the terminal is a network terminal, then the client loader thread 421 performs any necessary client application updates via a download using a file transfer program such as UDP or FTP, or any other socket layer protocols that are available for network file transfers to the network terminal 400.

Network Terminal—First Client Request to Server

Figure 5:
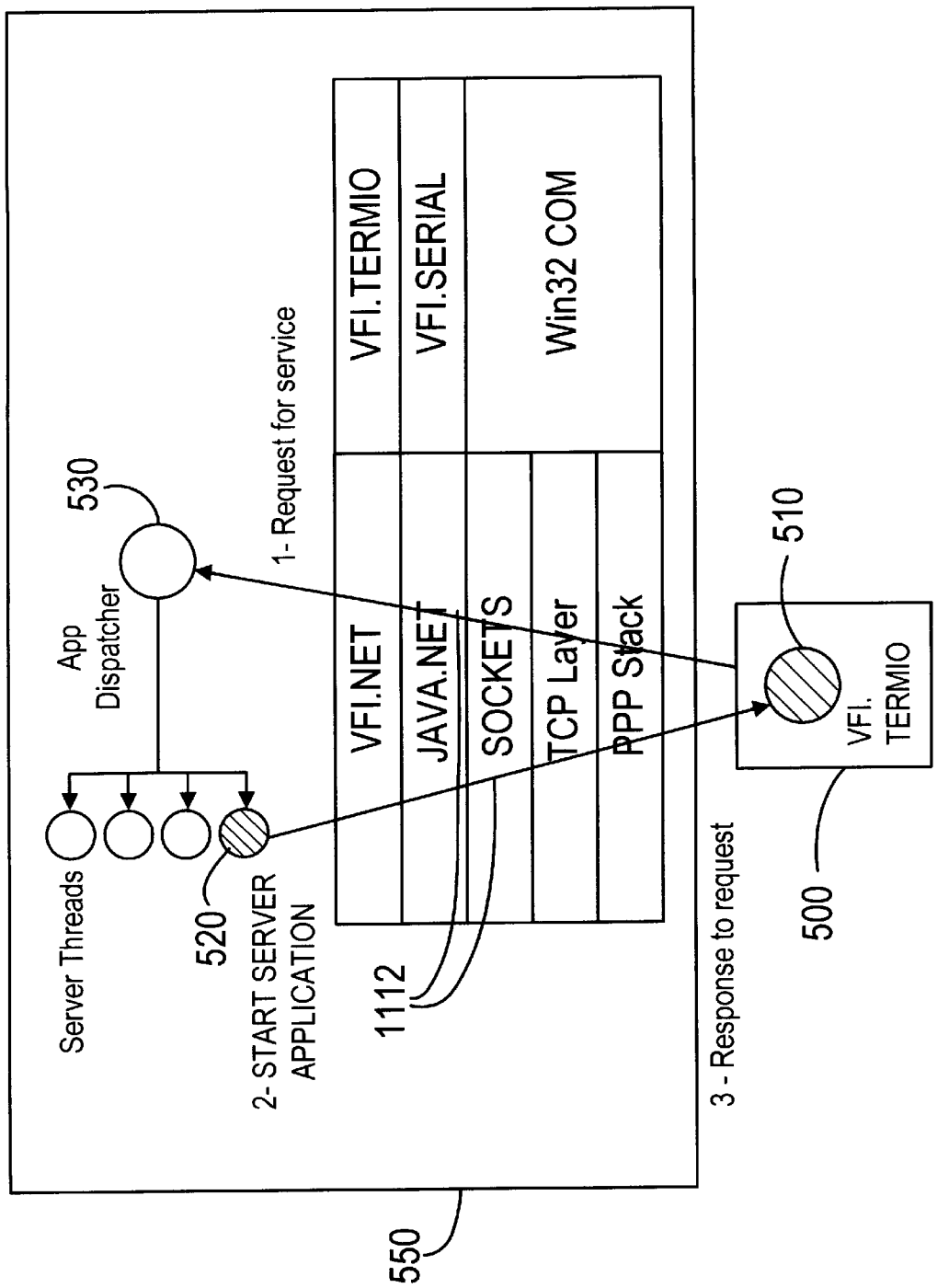
FIG. 5 illustrates a first client request to a server in accordance with a preferred embodiment.

FIG. 5 illustrates a first client request to a server in accordance with a preferred embodiment. When a first client request is transmitted from the network terminal 500 with a client application resident thereon 510 to the server 550, the application dispatcher 530 spawns the corresponding server application 520 for servicing the request at the server 550 via the assigned socket 1112. The server application 520 responds to the request and transmits information to the network terminal 500. The application dispatcher 530 has completed its responsibilities for this client 500 and can return to a wait state until the next "first connection" request from a client. The client application request could be as simple as a get current time request or a request for data from a server database.

Network Terminal—Subsequent Client Request to Server

Figure 6:
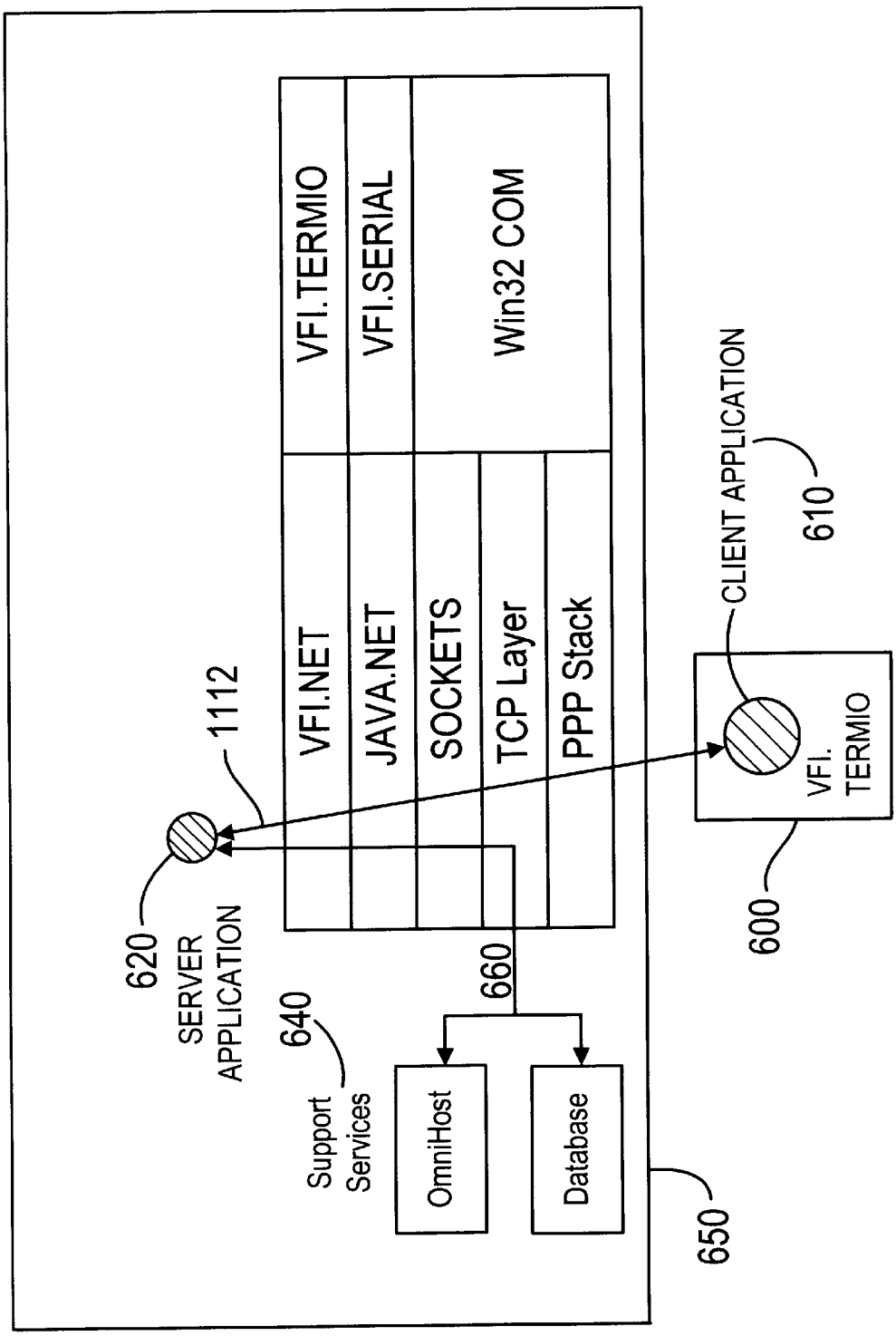
FIG. 6 illustrates a client server environment which accesses support services in accordance with a preferred embodiment.

FIG. 6 illustrates a network terminal 600 with a downloaded client application 610 which accesses support services in the server 650 through its assigned server application 620 in accordance with a preferred embodiment. The terminal 600 communicates to a server application 620 which accesses host processing capabilities and database services 640 to service requests emanating from the client application 610. The server application 620 handles any events that originate from the client application 610 via the assigned socket 1112. These events could include data requests from a database application, or data transfer to a server. Remote data from another server application could also be accessed by the client. Server application 620 accesses support services directly or via a socket interface 660.

Non-network Terminal—"First Connection"

Figure 7:
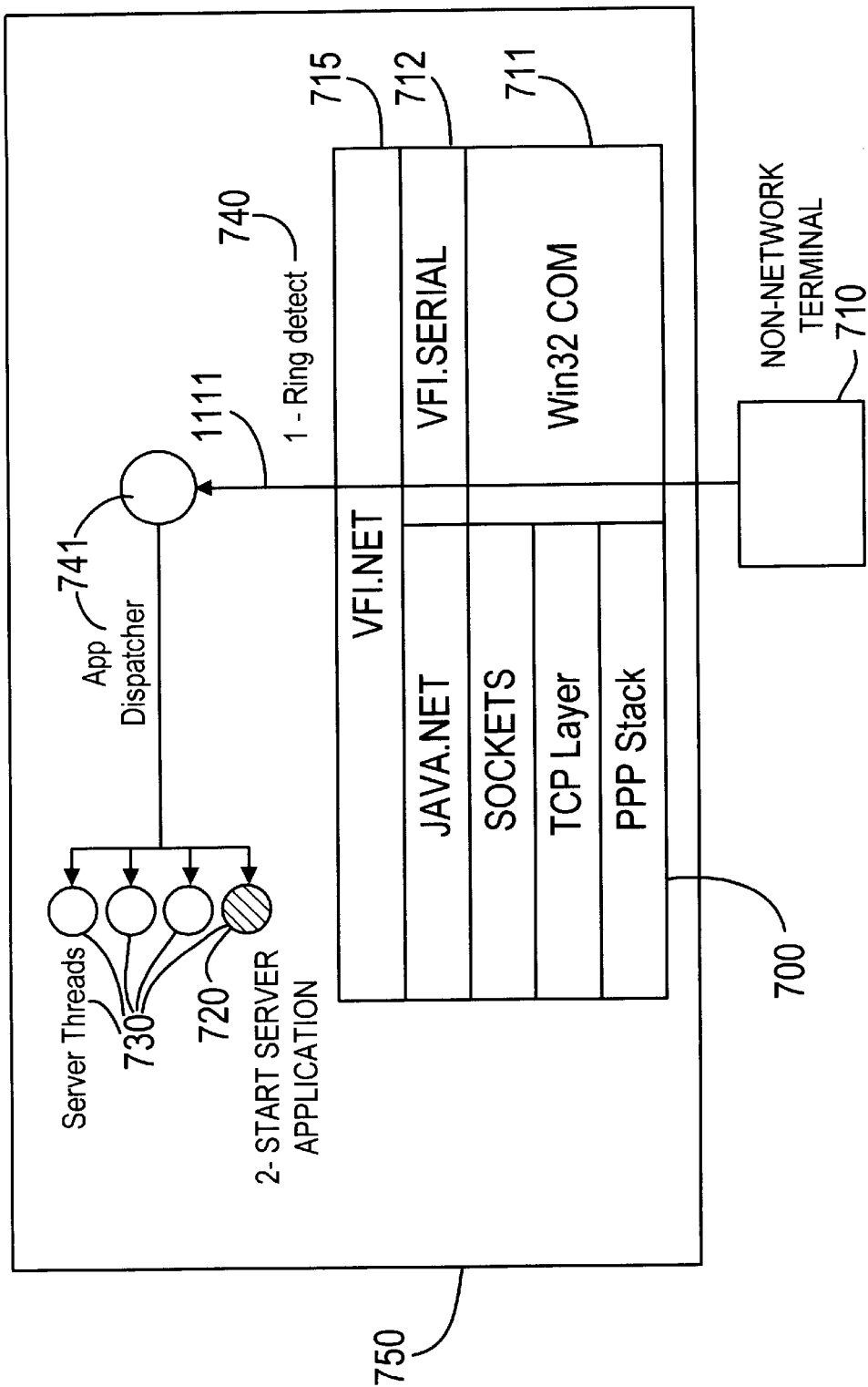
FIG. 7 is an architecture diagram of a client-server system in accordance with a preferred embodiment.

FIG. 7 is an architecture diagram of a client-server system in accordance with a preferred embodiment. A layered communication system 700 is used by a non-network terminal 710 to detect a ring providing an indicia of communication 740 and dispatch an application 730. Dispatching an application 730 also initiates a server thread 720 for servicing the client request. The non-network terminal 710 initiates a "first connection" by dialing up a modem, for example. The dial up goes through the native OS 711 (Solaris or Windows NT dial up layer) and is connected with the serial communication in the VFI.SERIAL layer 712 which abstracts the serial input/output functions into a higher level communication layer. The VFI.NET layer 715 takes the abstracted serial layer and maps it into a similar communication as the communication from the network terminal. It makes the dialup asynchronous connection appear to the server application as a new socket connection 1111. The communication is an event 740 that triggers actions by the application dispatcher 741 which responds to the "first connection" event by requesting ID information from the client, via an enquiry message, and starting the requested client application 720 at the server 750.

Non-network Terminal—First Client Request to Server

Figure 8:
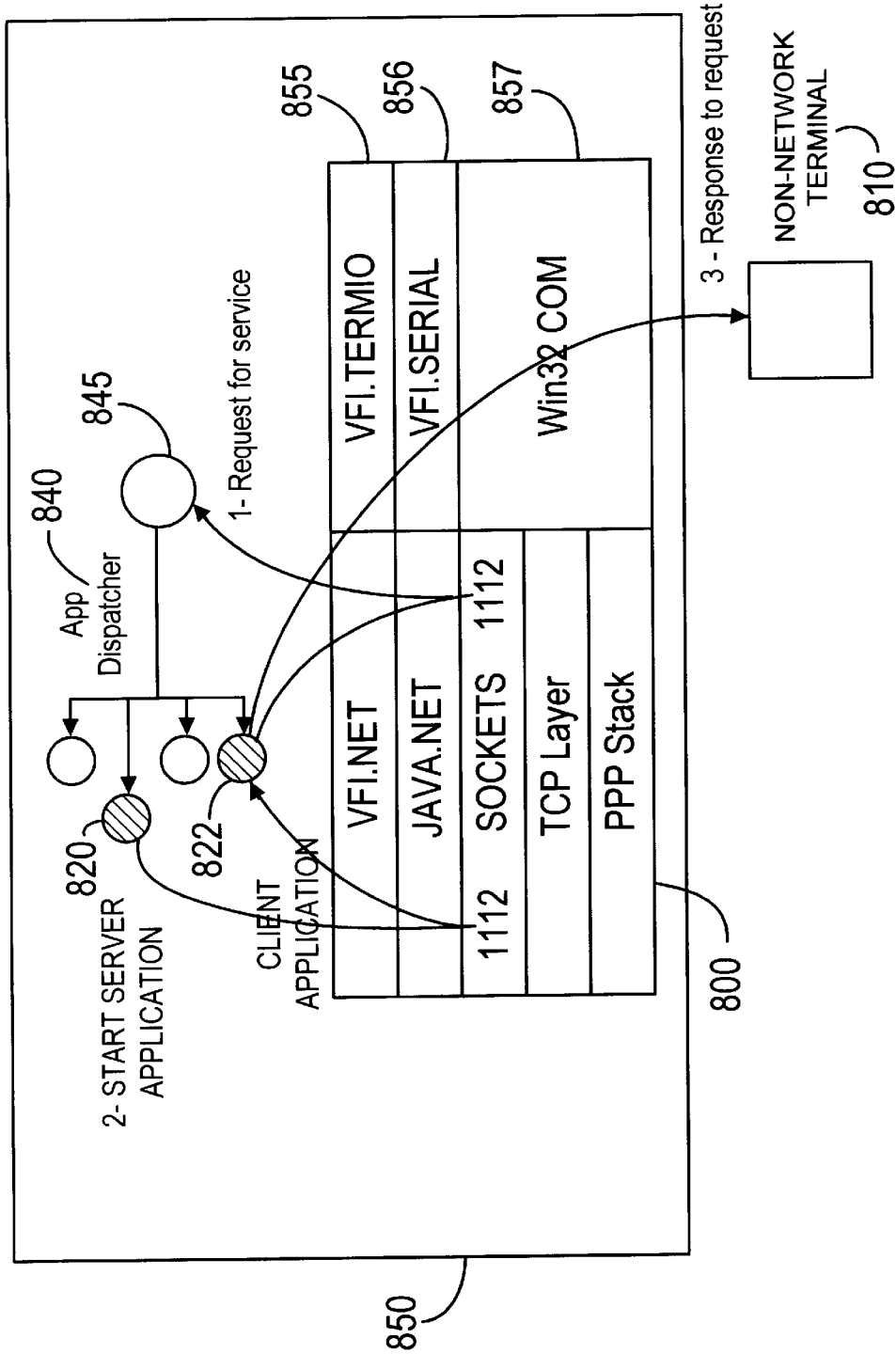
FIG. 8 is an architecture diagram of a client-server system in accordance with a preferred embodiment.

FIG. 8 is an architecture diagram of a client-server system in accordance with a preferred embodiment. The client application 822 is responsible for managing the non-network terminal 810. The client application 822 writes information, utilizing a server version of VFI.TERMIO 855, to and responds to key presses by the non-network terminal 810 at the server 850. The client application 822 initially makes a request for service from a socket 1112 that is associated with the non-network terminal 810 when the application dispatcher 840 spawns the client application 822.

When the first request 845 is generated by the client application 822 residing on the server 850, at application startup, the first request for service is routed in the server 850 to the application dispatcher 840 and spawns the server application 820 which will handle subsequent requests. The server application 820 makes a request for service from a socket 1112 that is associated with the client application 822 which transmits an appropriate command through the VFI.TERMIO 855 to the VFI.SERIAL layer 856 using the operating system communication support 857 to the non-network terminal 810. This processing is identical to the network terminal processing with the exception that all applications reside on the server 850 as opposed to a Java application executing remotely on the network terminal.

One advantage of Java is that it is machine independent and does not care whether a Java application resides on the client or the server. In the case of the non-network terminal, the client application resides in the server and controls the Java incapable terminal.

Non-network Terminal—Subsequent Client Requests to Server

Figure 9:
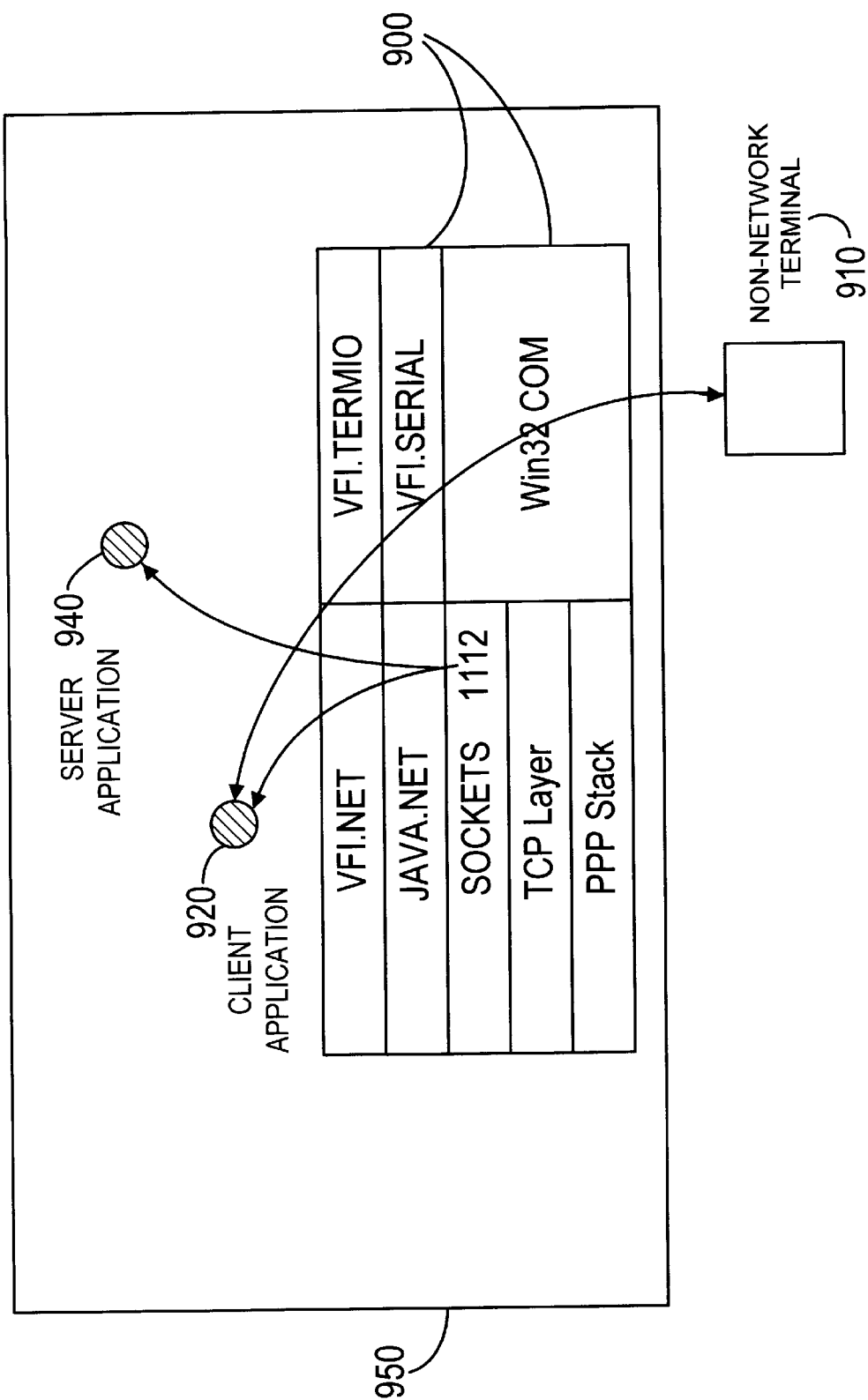
FIG. 9 is an architecture diagram of a client-server system in accordance with a preferred embodiment.

FIG. 9 is an architecture diagram of a client-server system in accordance with a preferred embodiment. A layered communication system 900 is used by a non-network terminal 910 to manage the interconnection of a server Application 940 to a client application 920 and facilitate communication between the terminal 910 and server application 940 via a client application 920 resident on the server 950. FIG. 9 shows the processing after the first request has been completed and the client application 920 is coupled with the server application 940 via the assigned socket 1112 just as in the network terminal example, except the client application 920 and server application 940 both reside on the server 950.

If a terminal responds with a message that indicates it is a non-network terminal, then the terminal is supported with the command streams described in FIGS. 10–14. If the terminal is a network terminal, then the application is downloaded via a FTP or other network file transfer procedure.

FIG. 10 illustrates the structure of a packet in accordance with a preferred embodiment. FIG. 11 shows the format of each field of a communication and describes the contents of the same. For example, the header is two bytes in length and has various values that correspond to different types of transactions. Similarly, the Packet Type, Header CRC, Sequence #, Data Block and CRC-16 fields are described in the table set forth in FIG. 11.

FIG. 12 represents a table showing additional details associated with the device types, commands and data parameters. For example, the device type field is one byte long and specifies the selected Input/Output device. FIG. 13 illustrates the display commands in accordance with a preferred embodiment. The display's device type is zero. FIG. 14 presents the status values associated with various requested operations in accordance with a preferred embodiment.

Figure 15:
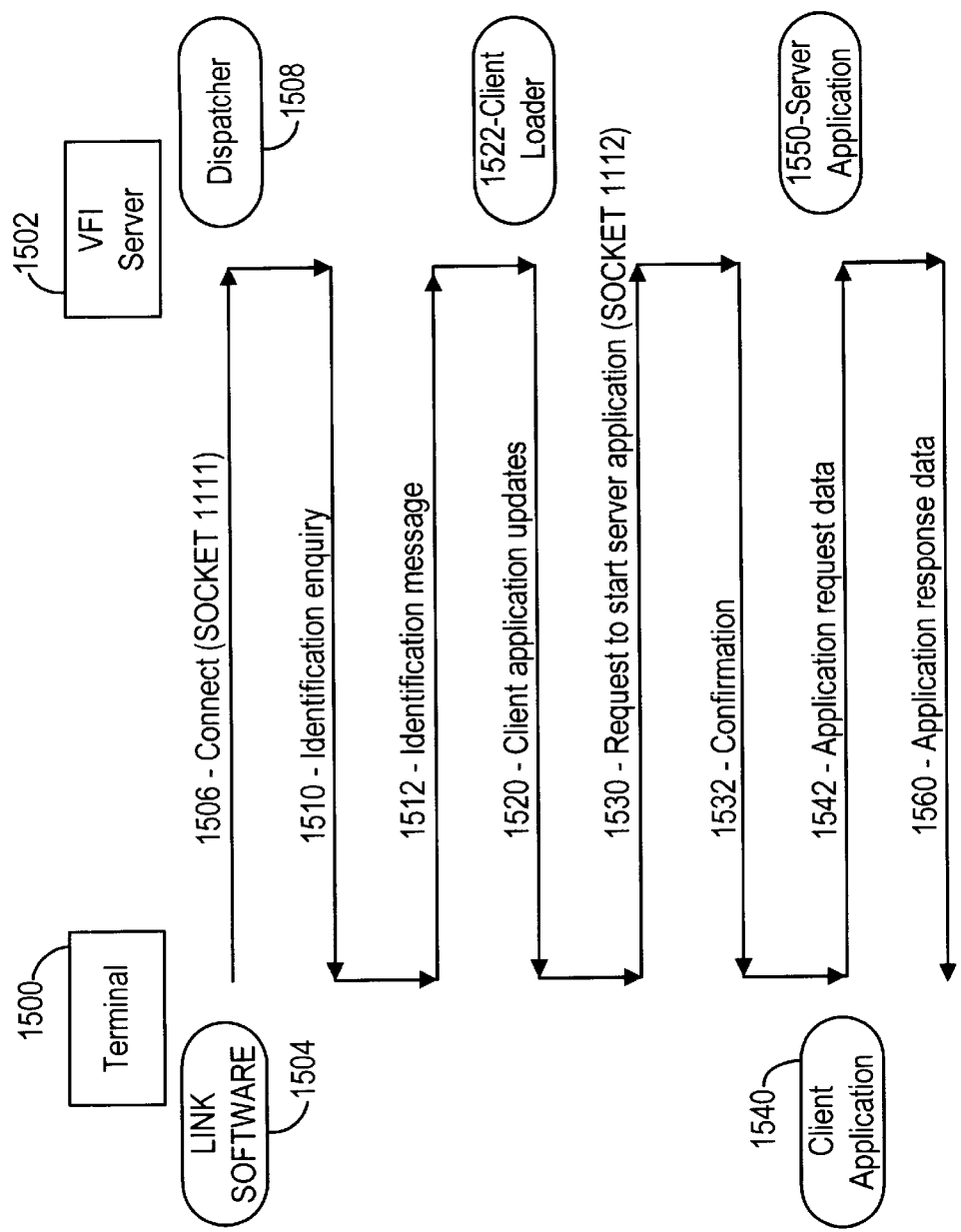
FIG. 15 is a communication flow diagram in accordance with a preferred embodiment.

FIG. 15 is a communication flow diagram in accordance with a preferred embodiment. A terminal 1500 either has firmware or an application 1504 that initiates a connection 1506 (with a server 1502 by contacting a dispatcher 1508. The connect initiate 1506 also connects a socket 1111 to handle the connection. The dispatcher 1508 transmits an identification enquiry 1510 which the client terminal replies to with an identification message 1512. In the case of a network terminal, the client loader 1522 performs any necessary client application updates 1520 on the client terminal 1500. In the case of a non-network terminal, the dispatcher starts the client application. The client then sends a request to start the server application 1530 to the server which results in the connection of a socket 1112 and the server application 1550 being started and a confirmation message 1532 being transmitted back to the client application 1540. Then, when the client application 1540 requests data 1542 from the server application 1550, the server application 1550 responds with the application response data 1560.

Application Dispatcher—Control Flow Application Dispatcher Startup

Configured modem ports that will take part in transactions are pre-configured. The Application Dispatcher (AD) startup code looks at this configuration stream to determine the number of S threads (serial port listeners). S classes instantiate a VFI.NET.serversocket object which in turn create a VFI.NET.ModemIO.ModemPort object. The ModemPort object binds to a low level VFI.NET.ModemIO.Port object which utilizes native methods to configure and wait on the communications port.

```
SO
{
    serversocket SOSocket = new serversocket ("socketl 111",1);
        //Listener
object
    {
        socket SOConnSocket = SOSocket.accept(); // Translates to
    WaitDevice(CONNECT)
        ReadAndValidate (RequestID);
        return RequestID, SOConnSocket;
    }
}
```

Request Processing

As illustrated above, S threads are transient threads. And even when alive they perform efficient waits (No CPU cycles are consumed). The AD receives the RequestID from each S thread. Request processing is performed by database lookup. Typically Requests, are simple text messages with delimiters and are parsed using a StringTokenizer object.

StringTokenizer stParseHelp=new StringTokenizer ((String) Request);

field 1=stParseHelp.nextToken( );

field2= . . . and so on.

The AD will query a database to determine which applications should be initiated based on the enquiry message utilizing an SQL query of the form:

"SELECT <Field ClassPath> from <TableName> where <f1=field1 and . . . >;

is handled by the JDBC layers to return data to the AD. The AD is now ready to run the client thread.

ClientThread=new Thread (field1, field2 . . . , SOConnSocket);

The field list contains appropriate fields (those required for client application processing) and are passed down to the client thread along with the connected socket object.

Client Threads

Client Threads proxy the actual application. Application output meant for the terminal's devices are routed out using VFI.TERMIO as directives to the client terminal's firmware. The connected socket (which translates to a live dial-up connection) is passed down from the AD to the client thread. Client threads are long living—usually transferring data to corresponding servlets that initiate connections to upstream hosts or make database transactions. Despite the fact that client threads can be JDBC aware, servlets handle database transactions. This helps to maintain code constancy when the same client class is downloaded to a Java capable terminal for remote execution.

Terminal I/O is performed through a VFI.TermIO object that in turn instantiates a VFI.TermIO.ServProtocol object. The protocol object implements the actual data transfer with the client terminal. The protocol object requires the socket object passed down from the AD to the client thread.

CO (Appropriate Request fields, SOConnSocket)

```
{
    VFI.TermIO IOObject = new TermIO (SOConnSocket);//IO object
//instantiation. This cascades into a ServProtocol Object instantiation.
    IOObject.WriteString (StringIndex); //Displays a particular
        string on the P-
ATM.
    //If the client needs to retrieve data from upstream
        hosts (OmniHost, VISA
etc.), //or needs data from a database it makes a TCP stream
connection to a servlet.
    //This is consistent with the behavior of the network
        terminal which would
//make the same connection over PPP.
    clienTransObject = new Socket (<Host>, <Well known socket>);
        //Explained further down under initial client requests
        .....                 //Further processing
    //Send out host requests
    clienTransObject.write (HostRequest);
    clienTransObject.read (HostResponse);
    IOObject.WriteString (StringIndex + n);
        //Displays status on the P-ATM.
    }
```

Initial Client Request Processing

The AD runs a T thread (spawned off during startup) that listens on a well-known socket (e.g. 1112) waiting for initial ClientRequests from a client application. The T thread processes the ClientRequest to determine which servlet class needs loading.

```
T
{
    ClientInitialRequestListener = new ServerSocket
        (<wellknown socket (e.g.
1112)>);
    //Wait for initial requests and spawn off server connSocket =
    ClientInitialRequestListener.accept();
    connSocket.Stream.read (InitialRequest);
    Parse (InitialRequest);
    HostThread H0 = new Thread (connSocket, "class name");
}
```

The T thread is a daemon thread and lives as long as the AD lives. When the client application is downloaded to a Java capable terminal initial requests arrive over the PPP link.

Host Threads or Servlets

Host Threads (H) service client requests for upstream and database connectivity. A host thread can make TCP connections with remote hosts, forward financial transactions originating from the client application and route the response.

```
HO (connSocket)
{
    connSocket.Stream.read (ClientRequest);
    ParseRequest (StringTokenizer);
    Socket upstreamSock = new Socket (upstreamHost, Port);
    //Transact
    connSocket.Stream.Write (HostResponse);
}
```

Transient and Long-living Threads in the Application Dispatcher

A sockets based abstraction of the Win32 communication API

Consistence in the access of transport layer services needs no over emphasis. The design of the PTS server aims to provide a uniform interface to third party client component and server component applet writers to the async dial-up protocol module and the system's TCP/SLIP/PPP stack. This interface comprises a set of Java Classes collectively called VFI.NET.*. It should be noted that this package does not provide pure TCP/UDP/IP specific objects and methods that are already defined and implemented in java.net.*. Programmers, however, do not need to explicitly import java.net.*. This is automatically done by the package. Further, this document does not discuss the functionality of java.net.* which may be found in the appropriate JDK documentation. It, merely, details a class design that overloads methods specifically necessary to build a BSD sockets like layer between calling applets (servlets) and the machine specific Java serial communications package.

Hierarchy

A uniform upper edge interface for the ModemIO classes permits easy replacement of the implementation. The actual modem handling code, for instance, may use the TAPI client calls instead of direct Win32 communication calls. Multiple libraries that conform to the same interface allow different link level protocol stacks (like MNP3). This ensures the constancy (and hence direct portability) of VFI.ModemIO.*.

Required ModemIO Functionality

1. Open an end-to-end async, duplex dial-up connection. The station address (InetAddress as in TCP/IP) is the dial string. Configure upon connection.

2. Listen for an incoming dial-up connection. The listen port (analogous to the bound TCP port) is the COM port. In this regard the valid port numbers range from 0–0xFF (which is the maximum number of COM ports allowed in NT). Configure upon initialization.

3. Obtain Input and Output streams that re-direct from/to the open connection.

4. Hang-up (close as in TCP/IP) a live connection.

The following classes form a part of VFI.ModemIO.*:

Raw Serial Port Handling

```
public class VFI.ModemIO.Port
{
    //Constructors
    public Port (int nPortNum);
    public Port (int nPortNum, int nBaud, int nParity, int nDataBits, int nstopBits);
```

-continued

```
    public Port (int nportNum, String sCfgStr);
    public Port (String sPortName);
    public Port (String sPortName, String sCfgStr);
    //Methods
    public void close();
    public int getportID();
    public String getPortName();
    public String getCfgStr();
    public InputStream getInputStream();
    public OutputStream getOutputStream();
}
            Modem initiation and methods
public class VFI.ModemIO.ModemPort
{
    //Constructors
    public ModemPort (int nPortNum);
    public ModemPort (Port objPort);
    public ModemPort (String sPortName);
    public ModemPort (int nPortNum, String sInitString);
    public ModemPort (Port objPort, String sInitString);
    public ModemPort (String sPortName, String sInitString);
    //Methods
    public Port getPort();
    public boolean connect (String sDialString);
    public void disconnect();
    public void reset();
    public boolean configure (String sCfgStr);
    public boolean configureDM (String sCfgStr);
}
```

Programmers must use getPort( ) to capture a stream and transfer data over the ModemPort. Configure(String) sends out an AT command and returns TRUE if the modem returned OK<cr><1f>.configureDM(String) sends out the same command to the modem when in data mode.

NET—The Sockets Wrapper

The package encapsulates two major classes found in java.net.*-Socket and ServerSocket. To present a familiar interface and yet avoid conflicts, the package instantiates its own socket and serversocket objects via constructors that take an extra parameter (that identifies the lower object that needs to be instantiated). This is illustrated after the class definition.

Station Address Resolution

The InetAddress object refers to an unique long value that corresponds to the machines TCP/IP address. The async dial-up line may however use multiple COM ports to open a connection with the host. Heuristically, it may seem that fitting the TCP/IP host/machine address into the native COM support library will permit overloading of InetAddress and hence enhance elegance. This, however, results in extra and avoidable complexity. In this regard, InetAddress will still correspond only to a TCP/IP address. The versions of the java.net.Socket constructor that accept the host name (as a String) will, instead, be overloaded. This value will now refer to a dial String that identifies the remote station address.

Socket Initialization and Connection

```
public class VFI.NET.socket
{
    //Constructors
    public socket (String sHost, int nPort, int nProtocolType);
    /*   nProtocolType may take one of two values:
```

-continued

```
        PF_INET #defined to 1
        PF_VFI_PTS_MODEMIO #defined to 2
    Passing a value of 0 causes the use of
java.net.Socket.*/
    //Methods
    public void close();
    public String getStationAddress();
    public int getPort();
    public InputStream getInputStream();
    public OutputStream getOutputStream();
}
public class VFI.NET.serversocket
{
    //Constructors
    public serversocket(int nPort, int nProtocolType);
    /*.  nProtocolType may take one of two values:
    PF_INET #defined to 1
    PF_VFI_PTS_MODEMIO #defined to 2
    Passing a value of 0 causes the use of java.net.ServerSocket.* /
    //Methods
    public socket accept();
    public void close();
    public int getPort();
    }
```

Interface Library to native Win32 Comm. API methods

HANDLE OpenDevice (int nDevNum, DCB * pNewDCB);

void CloseDevice (HANDLE hDevice);

int WriteDevice (HANDLE hDev, int nBytesToWrite, unsigned char * pWriteBuf);

int ReadDevice (HANDLE hDev, int nBytesToRead, unsigned char * pReadBuf);

BOOL ConfigureDevice (HANDLE hDev, DCB * pNewDCB);

Application Dispatcher Architecture

Figure 16:
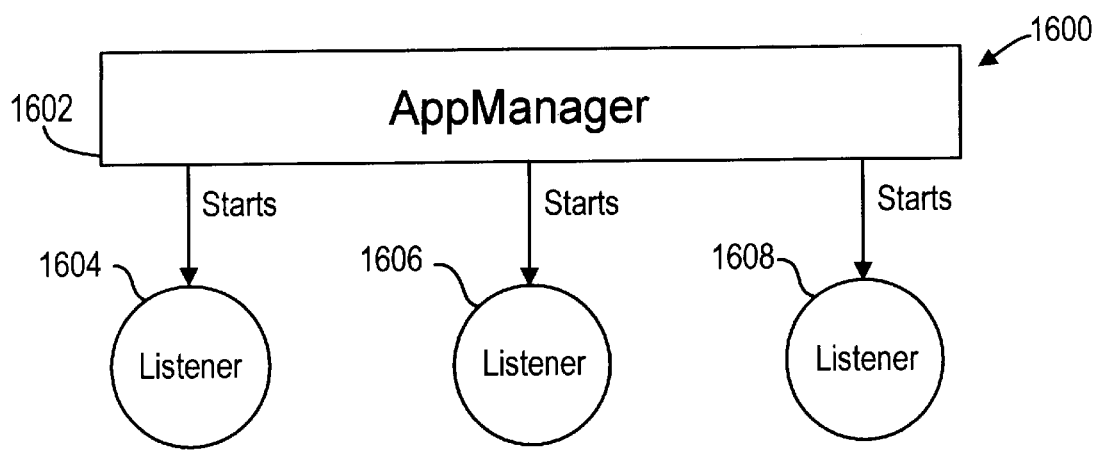
FIG. 16 illustrates an application dispatcher that includes listeners in accordance with one embodiment of the present invention.

FIG. 16 illustrates an application dispatcher 1600 that includes listeners 1604, 1606, 1608 in accordance with one embodiment of the present invention. AppManager 1602 starts listeners 1604, 1606, and 1608. For example, AppManager 1602 starts a listener for each type of connection as defined in the database (e.g., shown and discussed above with respect to FIG. 6). Each listener is responsible for managing applications associated with its type of connection (e.g., TCP/IP, phone line concentrator, and serial port connections). Each listener is assigned to a particular port number of the server.

Figure 17:
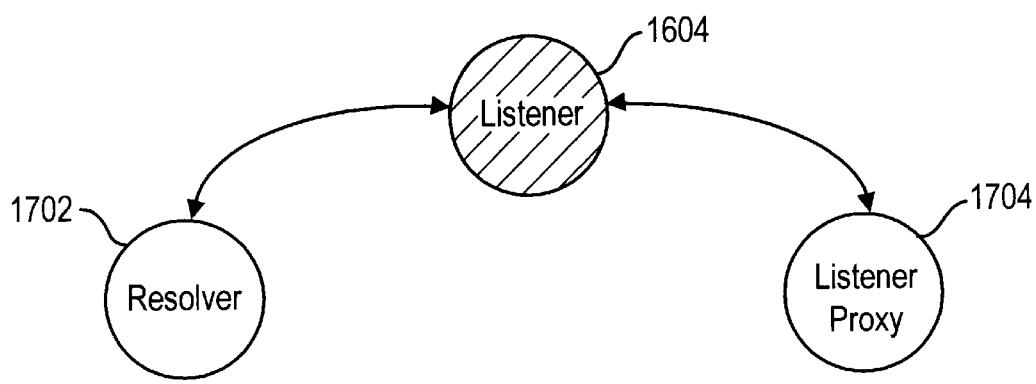
FIG. 17 illustrates the listener controlling a listener proxy and a resolver in accordance with one embodiment of the present invention.

FIG. 17 illustrates listener 1604, which controls a resolver 1702 and a listener proxy 1704 in accordance with one embodiment of the present invention. Thus, AppManager 1602, which is shown in FIG. 16, controls resolver 1702 (e.g., a resolver thread instantiated by listener 1604) and listener proxy 1704 (e.g., a listener proxy thread instantiated by listener 1604). In one embodiment, each listener started by AppManager 1602 controls two other entities; a single listener proxy thread, which manages new connections; and many resolver threads, which are responsible for starting the appropriate server application.

Figure 18:
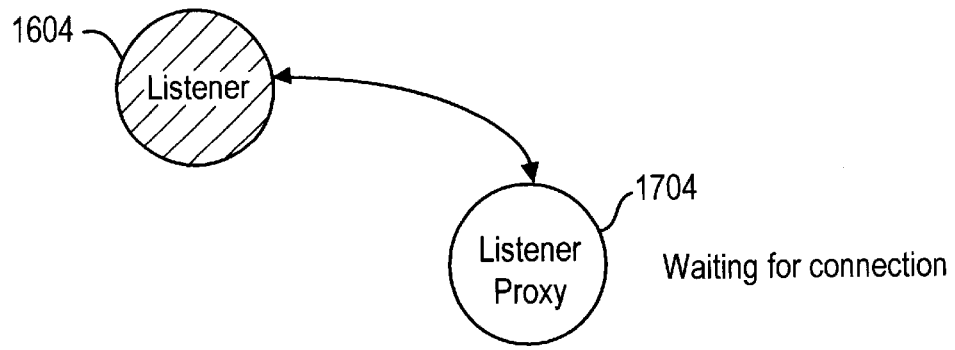
FIG. 18 illustrates the listener proxy waiting for new connections in accordance with one embodiment of the present invention.

FIG. 18 illustrates listener proxy 1704, which is controlled by listener 1604, waiting for new connections in accordance with one embodiment of the present invention. Listener proxy 1704 is responsible for placing new connections in a new connection queue of listener 1604.

Figure 19:
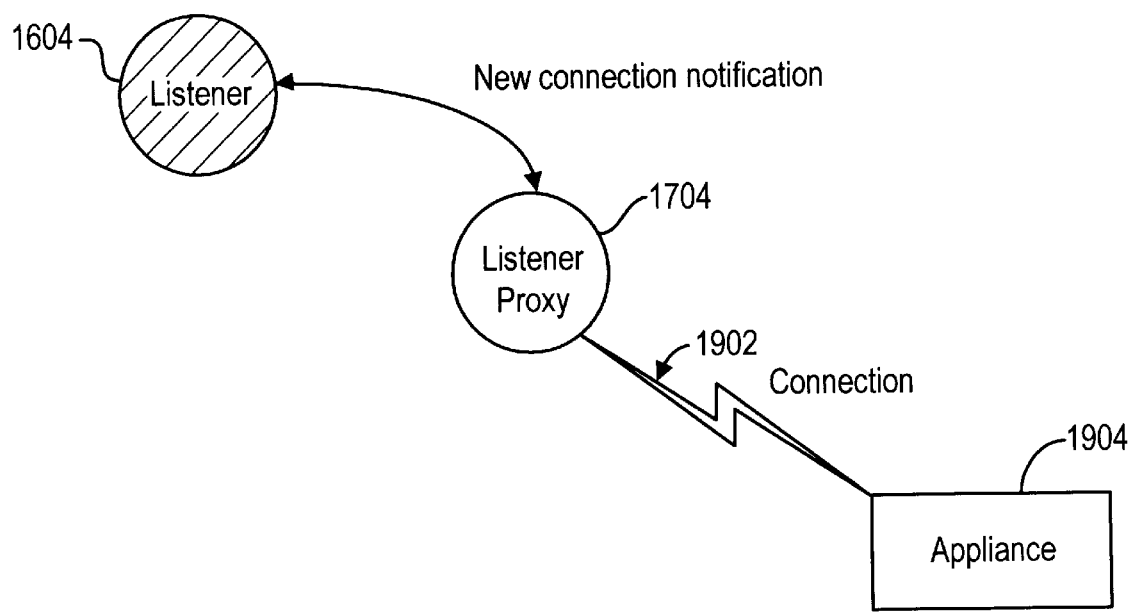
FIG. 19 illustrates the listener proxy detecting a new connection from an appliance in accordance with one embodiment of the present invention.

FIG. 19 illustrates listener proxy 1704 detecting a new connection 1902 from an appliance 1904 (e.g., a network terminal, such as a commercially available VeriFone PATM™ appliance or a PC) in accordance with one embodiment of the present invention. Listener proxy 1704 places the new connection in the new connection queue of listener 1604. Listener proxy 1704 then continues to wait for new connections. The maximum size of the new connection queue is configurable.

Figure 20:
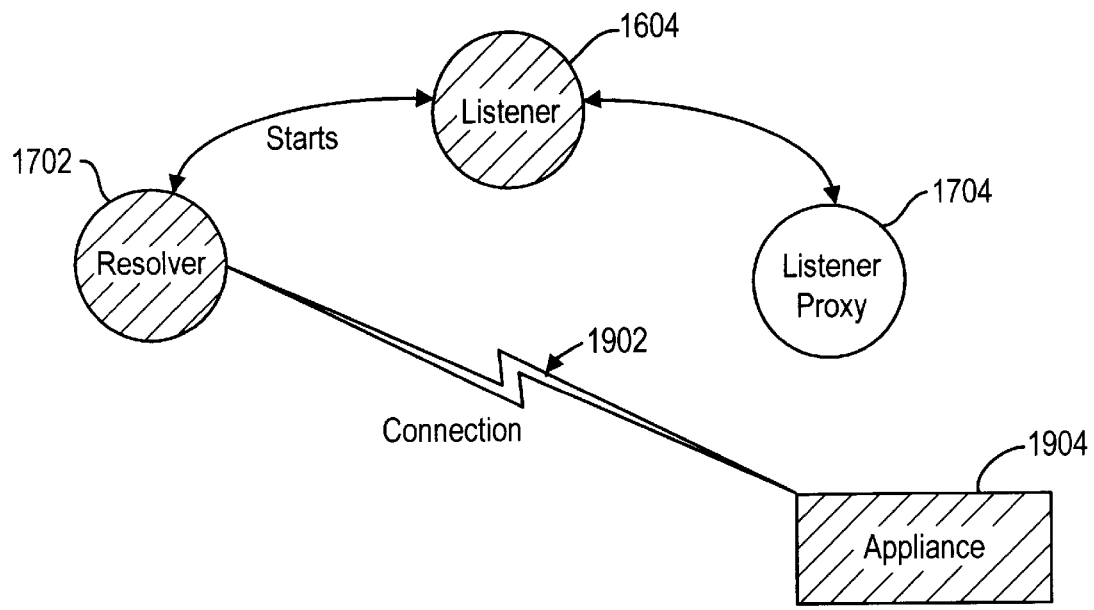
FIG. 20 illustrates the resolver handling the new connection from the appliance in accordance with one embodiment of the present invention.

FIG. 20 illustrates resolver 1702 handling new connection 1902 from appliance 1904 in accordance with one embodiment of the present invention. In particular, upon detecting a new connection in the new connection queue, listener 1604 instantiates resolver 1702. Listener 1604 passes new connection 1902 to resolver 1702.

For example, if appliance 1904 is a network terminal, such as a commercially available VeriFone PATM™ appliance or a PC, then resolver 1702 is responsible for executing "who are you" negotiation and for generating a session key. A variety of resolvers can be provided for a variety of appliances communicating via a variety of protocols. Examples of appliances include a commercially available VeriFone PATM™ appliance, a PC, a merchant Point Of Sale (POS) device, a cellular telephone, or a pager. Examples of protocols include TCP/IP, X.25, or a proprietary protocol.

In one embodiment, the listener's dynamic instantiation of the resolver functionality can be efficiently implemented using the well-known Java™ programming language: the listener can instantiate the appropriate resolver using the fully-qualified Java class name, which is provided in configuration data (i.e., resolver names are configurable). Accordingly, the functionality of the server can be enhanced without additional code modifications.

Figure 21:
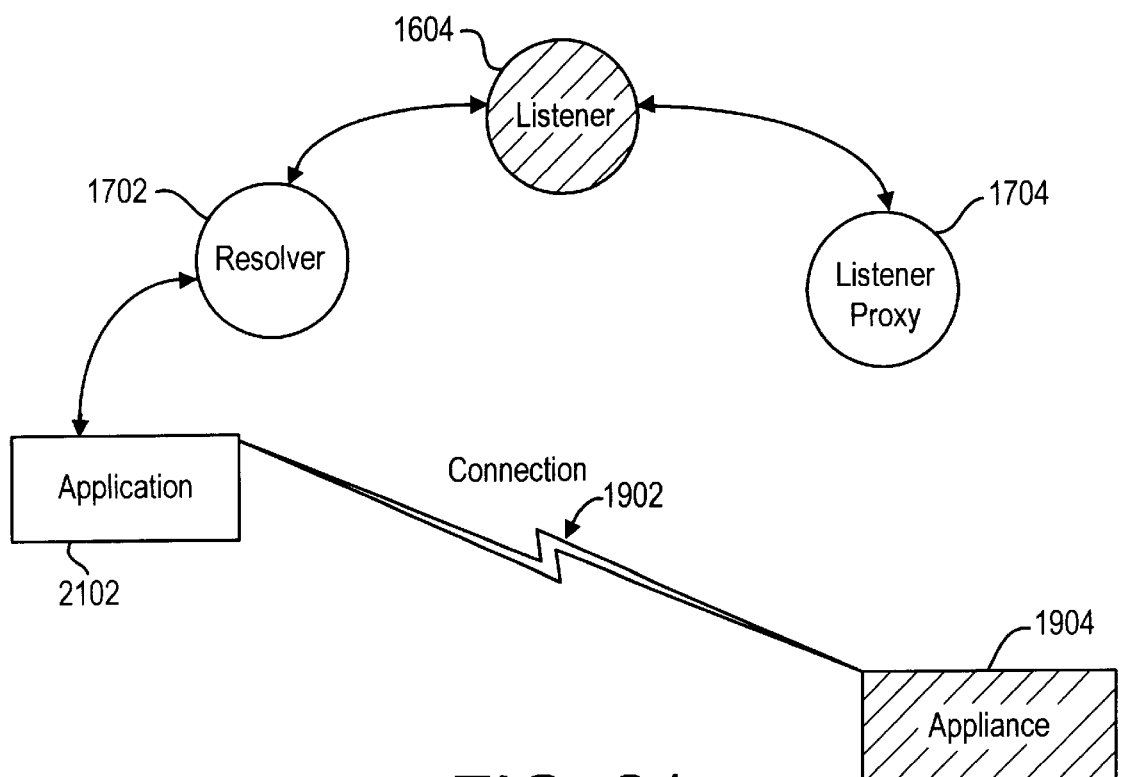
FIG. 21 illustrates the resolver starting an application in accordance with one embodiment of the present invention.

FIG. 21 illustrates resolver 1702 starting an application 2102 in accordance with one embodiment of the present invention. In particular, resolver 1702 interrogates appliance 1904 to determine its type and capabilities. Resolver 1702 then consults the database (e.g., as shown and discussed above with respect to FIG. 6) to determine which application to start. Resolver 1702 then starts the appropriate application, (in this example) application 2102. Application 2102 now controls appliance 1904. For example, connection 1902 is handled by low-level application interface libraries of application 2102.

Although particular embodiments of the present invention have been shown and described, it will be obvious to those skilled in the art that changes and modifications can be made without departing from the present invention in its broader aspects. For example, the application dispatcher can be implemented in a variety of programming languages and programming techniques, such as object-based programming techniques using the well-known Java™ programming language, the well-known C programming language, the well-known C++ programming language, or any combination thereof. Therefore, the appended claims are to encompass within their scope all such changes and modifications that fall within the true scope of the present invention.

What is claimed is:

1. A method for an application dispatcher for server application support for a plurality of client terminals, the client terminals in communication with a server via a network, the method comprising:

a client terminal initiating a connection to the server utilizing the network;

the server listening for the connection utilizing the application dispatcher, the application dispatcher starting a listener, the listener detecting the connection, the application dispatcher starting a resolver for the client terminal in response to the detecting of the connection, and the resolver handling the connection; and the server determining if the client terminal is a network terminal or a non-network terminal.

2. The method as recited in claim 1 further comprising:

if the client terminal is a network terminal, a client loader on the server updating a client application, if necessary, on the client terminal utilizing the network and starting a server application to service future requests from the client terminal; and if the client terminal is a non-network terminal, the server initiating the client application and the server application on the server for processing the client application at the server for the client terminal.

3. The method as recited in claim 1 further comprising:

the application dispatcher starting a plurality of listeners, wherein each listener is provided for a predetermined type of connection, each listener being responsible for managing an application associated with its type of connection.

4. The method as recited in claim 1, wherein the listener controls a listener proxy and a resolver, the listener proxy detecting the connection, the resolver starting an appropriate server application for the connection initiated by the client terminal.

5. The method as recited in claim 4, wherein the listener proxy places the connection in a new connection queue of the listener, and the listener proxy then continues to wait for new connections.

6. The method as recited in claim 1, wherein the client terminal comprises a network terminal, the resolver for the network terminal being responsible for executing "who are you" negotiation and generating a session key.

7. The method as recited in claim 1 further comprising:

the resolver interrogating the client terminal to determine its type and capabilities; and the resolver consulting a server database to determine which application to start.

8. The method as recited in claim 1, wherein the listener starting the resolver, further comprises:

the listener dynamically instantiating the resolver, wherein the listener instantiates the resolver utilizing a resolve name, the resolver name being provided in configuration data.

9. The method as recited in claim 8, wherein the resolver name comprises a fully-qualified Java class name.

10. The method as recited in claim 1, wherein the network comprises a dial-up network connection.

11. A system for an application dispatcher for server application support for a plurality of client terminals, the client terminals in communication with a server via a network, the system comprising:

a client terminal, the client terminal comprising client logic for initiating a connection to the server utilizing the network;

the server, the server comprising server logic for listening for the connection utilizing the application dispatcher, the application dispatcher starting a listener, the listener detecting the connection, the application dispatcher starting a resolver for the client terminal in response to the detecting of the connection, and the resolver handling the connection, and the server further comprising logic for determining if the client terminal is a network terminal or a non-network terminal.

12. The system as recited in claim 11, the server logic further comprising:

if the client terminal is a network terminal, a client loader on the server updating a client application, if necessary, on the client terminal utilizing the network and starting a server application to service future requests from the client terminal; and if the client terminal is a non-network terminal, the server initiating the client application and the server application on the server for processing the client application at the server for the client terminal.

13. The system as recited in claim 11, the server logic further comprising:

the application dispatcher starting a plurality of listeners, wherein each listener is provided for a predetermined type of connection, each listener being responsible for managing an application associated with its type of connection.

14. The system as recited in claim 11, wherein the listener controls a listener proxy and a resolver, the listener proxy detecting the connection, the resolver starting an appropriate server application for the connection initiated by the client terminal, and wherein the listener is assigned to a predetermined port number of the server.

15. The system as recited in claim 14, wherein the listener proxy places the connection in a new connection queue of the listener, and the listener proxy then continues to wait for new connections.

16. The system as recited in claim 11, wherein the client terminal comprises a network terminal, the resolver for the network terminal being responsible for executing "who are you" negotiation and generating a session key.

17. The system as recited in claim 11, the server logic further comprising:

the resolver interrogating the client terminal to determine its type and capabilities; and the resolver consulting a server database to determine which application to start.

18. The system as recited in claim 11, the server logic further comprising:

the listener dynamically instantiating the resolver, wherein the listener instantiates the resolver utilizing a resolver name, the resolver name being provided in configuration data.

19. The system as recited in claim 18, wherein the resolver name comprises a fully-qualified Java class name.

20. The system as recited in claim 11, wherein the network comprises a dial-up network connection.

21. A computer program embodied on a computer-readable medium for an application dispatcher for server application support for a plurality of client terminals, the client terminals in communication with a server via a network, the computer program embodied on a computer-readable medium comprising:

a client code segment for initiating a connection to the server utilizing the network;

a server code segment for listening for the connection utilizing the application dispatcher, the application dispatcher starting a listener, the listener detecting the connection, the application dispatcher starting a resolver for the client terminal in response to the detecting of the connection, and the resolver handling the connection, and the server code segment further comprising logic for determining if the client terminal is a network terminal or a non-network terminal.

22. The computer program embodied on a computer-readable medium as recited in claim 21, the server code segment further comprising:

if the client terminal is a network terminal, a client loader on the server updating a client application, if necessary, on the client terminal utilizing the network and starting a server application to service future requests from the client terminal; and if the client terminal is a non-network terminal, the server initiating the client application and the server application on the server for processing the client application at the server for the client terminal.

23. The computer program embodied on a computer-readable medium as recited in claim 21, the server code segment further comprising:

the application dispatcher starting a plurality of listeners, wherein each listener is provided for a predetermined type of connection, each listener being responsible for managing an application associated with its type of connection.

24. The computer program embodied on a computer-readable medium as recited in claim 21, wherein the listener controls a listener proxy and a resolver, the listener proxy detecting the connection, the resolver starting an appropriate server application for the connection initiated by the client terminal, and wherein the listener is assigned to a predetermined port number of the server.

25. The computer program embodied on a computer-readable medium as recited in claim 24, wherein the listener proxy places the connection in a new connection queue of the listener, and the listener proxy then continues to wait for new connections.

26. The computer program embodied on a computer-readable medium as recited in claim 21, wherein the client terminal comprises a network terminal, the resolver for the network terminal being responsible for executing "who are you" negotiation and generating a session key.

27. The computer program embodied on a computer-readable medium as recited in claim 21, the server code segment further comprising:

the resolver interrogating the client terminal to determine its type and capabilities; and the resolver consulting a server database to determine which application to start.

28. The computer program embodied on a computer-readable medium as recited in claim 21, the server code segment further comprising:

the listener dynamically instantiating the resolver, wherein the listener instantiates the resolver utilizing a resolver name, the resolver name being provided in configuration data.

29. The computer program embodied on a computer-readable medium as recited in claim 28, wherein the server code segment comprises Java code, and the resolver name comprises a fully-qualified Java class name.

* * * * *